United States Patent [19]
Delnick

[11] Patent Number: 5,865,860
[45] Date of Patent: Feb. 2, 1999

[54] PROCESS FOR FILLING ELECTROCHEMICAL CELLS WITH ELECTROLYTE

[75] Inventor: Frank M. Delnick, Dexter, Mich.

[73] Assignee: IMRA America, Inc., Ann Arbor, Mich.

[21] Appl. No.: 879,936

[22] Filed: Jun. 20, 1997

[51] Int. Cl.⁶ ..................................................... H01M 6/00
[52] U.S. Cl. ............................... 29/623.5; 429/80; 347/5
[58] Field of Search .................................. 429/50, 51, 52, 429/80, 124, 137, 189, 194; 29/890.1, 623.1, 623.5; 347/5

[56] References Cited

U.S. PATENT DOCUMENTS

| | | | |
|---|---|---|---|
| 3,953,566 | 4/1976 | Gore | 264/288 |
| 3,962,153 | 6/1976 | Gore | 260/2.5 R |
| 4,096,227 | 6/1978 | Gore | 264/210 R |
| 4,428,813 | 1/1984 | Stanier | 204/253 |
| 4,781,893 | 11/1988 | Dickakian | 422/69 |
| 4,849,457 | 7/1989 | Ichii et al. | 521/62 |
| 5,082,516 | 1/1992 | Akao et al. | 156/277 |
| 5,542,972 | 8/1996 | Von der Eltz et al. | 106/22 |
| 5,741,607 | 4/1998 | Gilmour | 429/94 |

OTHER PUBLICATIONS

"Ink Jet Printing", pp. 60, 73–82 (Author and Publication Unkown) No Date Available.

*Primary Examiner*—Kathryn Gorgos
*Assistant Examiner*—Wesley A. Nicolas
*Attorney, Agent, or Firm*—Knobbe, Martens, Olson & Bear, LLP

[57] ABSTRACT

A process for manufacturing an electrochemical cell comprising the steps of providing an electrode and applying electrolyte to the electrode using an ink-jet printer. In the preferred embodiment of the present invention, an ink-jet printing process is utilized to print the electrolyte onto the surface of the electrodes and separators or the electrode/separator bilayers. The ink-jet printing accurately meters and uniformly distributes the electrolyte throughout the pore structure of the separator and the electrode without contaminating the cell gasket. Preferably, a drop-on-demand ink-jet printing head is used to facilitate the electrolyte printing process. The ink-jet printing head is electronically pulsed to form and eject the electrolyte droplets from a nozzle of printing-head. The volume and the distribution of each electrolyte droplet are accurately determined and controlled by varying the pulse width and the pulse frequency of the printing head.

18 Claims, 5 Drawing Sheets

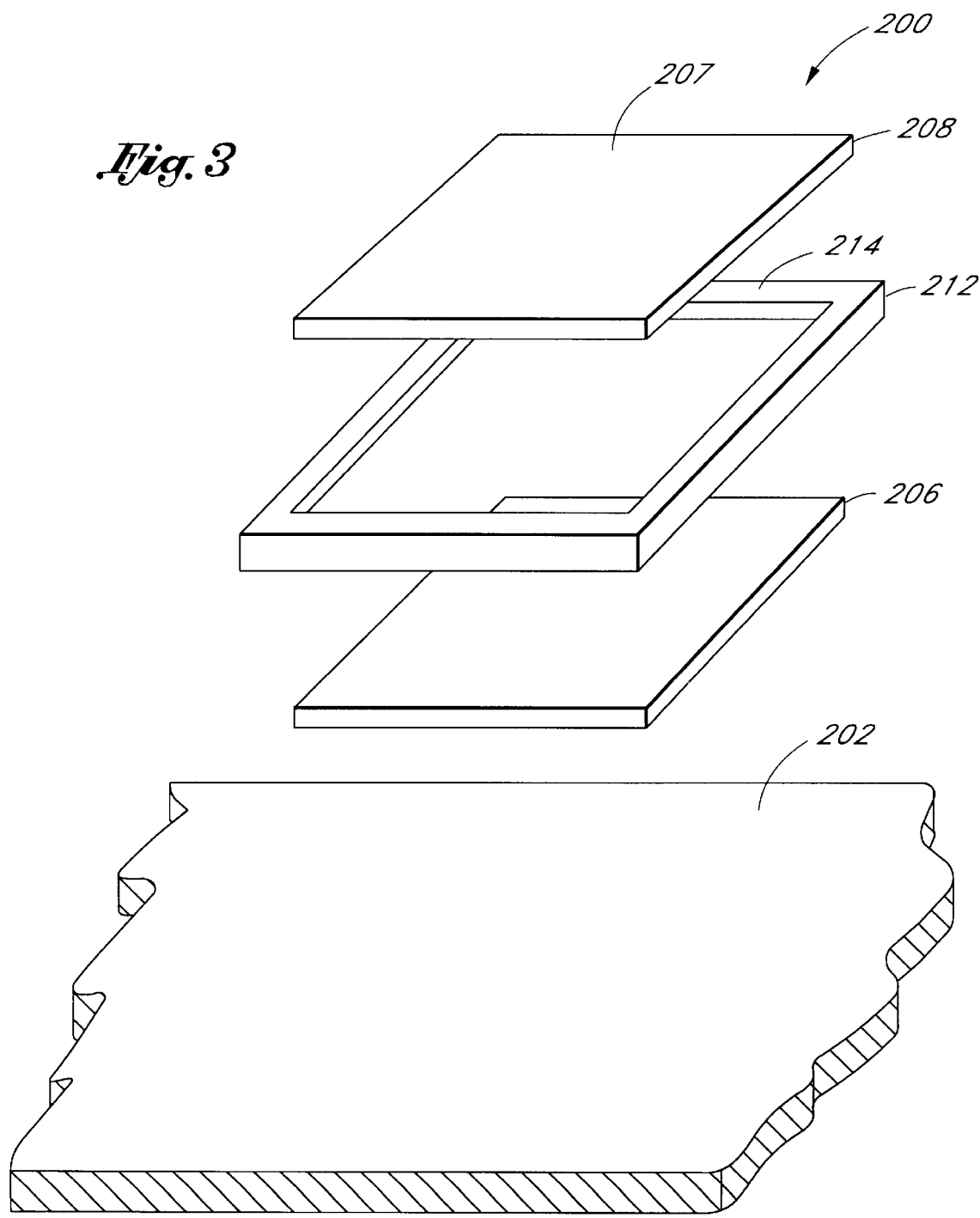

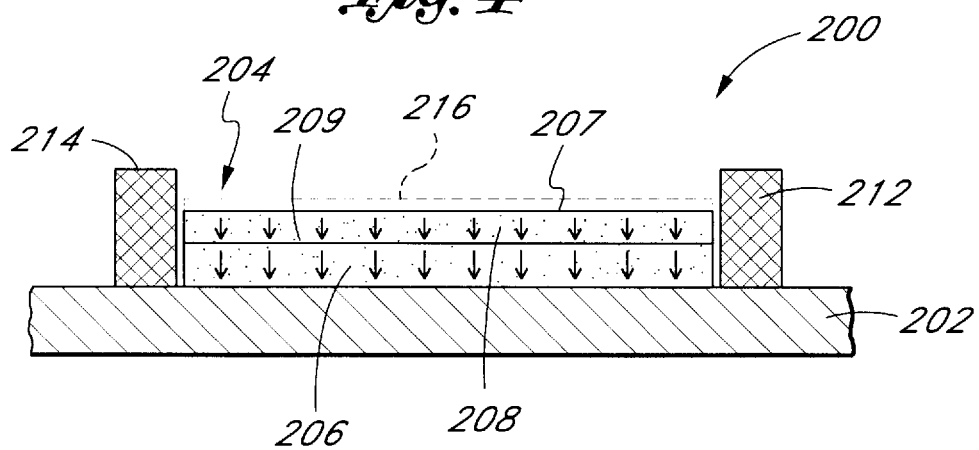
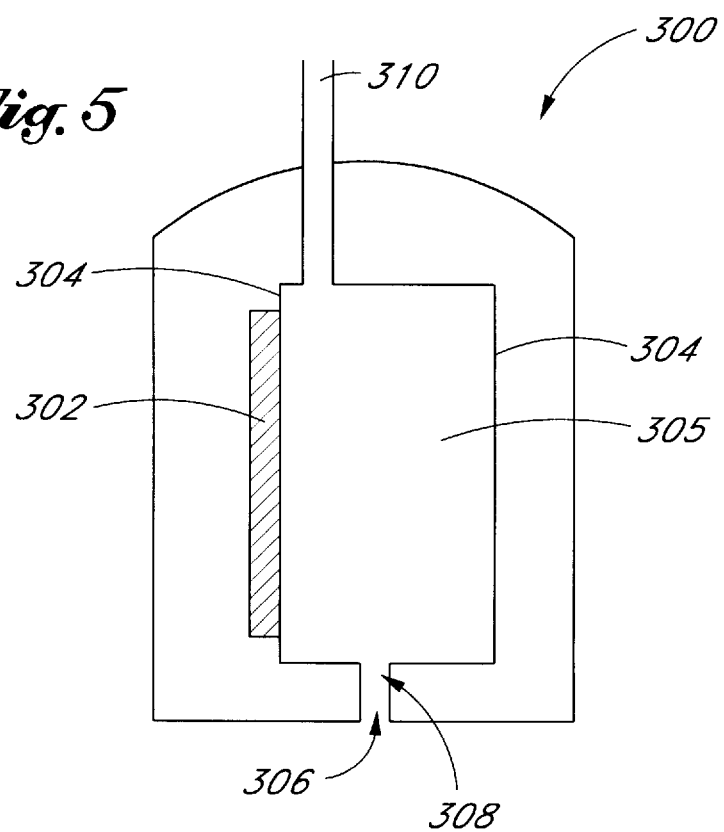

PROCESS FOR FILLING ELECTROCHEMICAL CELLS WITH ELECTROLYTE

BACKGROUND OF THE INVENTION

1. Field of the Invention

The present invention generally relates to electrochemical cell design and fabrication and, more particularly, to techniques for filling the electrochemical cells with electrolyte solutions.

2. Description of the Related Art

In the manufacture of electrochemical power supplies, there is a great deal of interest in developing better and more efficient methods for storing energy in electrochemical cells having high energy density and high power density. Increasing power per unit volume and increasing discharge characteristics depends on the ability to fabricate thinner electrodes and thinner separators. Accordingly, there has been an increasing effort to develop such thin and improved performance electrochemical cells using cost-effective methods.

An electrochemical cell uses its cathode and anode electrodes to generate an electric current. The electrodes are separated from one another by a porous separator element. During the manufacture of the electrochemical cell, the anode, the separator and the cathode are laminated together to form a laminated cell structure. This laminated electrochemical cell structure is then filled with an electrolyte solution to maintain the flow of ionic conduction between the electrodes. The amount and the distribution of electrolyte within the cell volume is important for the cell's overall performance. In fact, flooding or depletion of the cell electrolyte severely impairs cell performance and may cause failures.

In the prior art, there are several methods for filling electrochemical cells with electrolyte. In one exemplary prior art process, the laminated cell structure is rolled on a mandril to yield a cylindrical spiral wound roll, which is referred to as "jelly roll". The roll is then placed into a container having an electrolyte fill port. Once the container is sealed, electrolyte is injected into the container through the fill port and subsequently the fill port is sealed. In another prior art process, the laminated cell structure is maintained in a flat prismatic configuration and soaked in an electrolyte solution until the porous laminated structure is flooded. Subsequently, the cell is placed into a cell container and the container is sealed.

However, as state-of-the-art electrodes and separators get thinner to increase the power density of the cell, such established prior art processes for filling cells become less efficient. The state of the art thin electrochemical cells include micro-porous cell components (i.e., separators and electrodes). These components contain smaller pores which inhibit the transport of liquid electrolyte throughout the cell. For example, the transport of the electrolyte in the porous cell structure may be significantly reduced or inhibited if the surface tension of the electrolyte is not significantly lower than the surface energy of the porous media. Additionally, as liquid electrolyte enters the pore structure of the electrodes and separator, gas (typically air) in the pore structure must be displaced with the electrolyte. However, thin separators also restrict the egress of gas from the cell. These conditions greatly increase the amount of time required to fill the cell with electrolyte, and the difficulty in assuring a uniform filling of the separator material.

In order to overcome these problems, several modifications in the prior art processes have been suggested. In one technique, the thin laminated structure is placed into a container having an adequate headspace. The head space is to accommodate the overflow of electrolyte above the cell until the electrolyte is drawn into the separator and porous electrode structures. However, due to the slow displacement of gas in the porous structure, this technique is time consuming and increases the manufacturing cost.

Alternatively, to decrease the amount of time required for this filling process, surfactants can be added to the electrolyte to reduce the surface tension of the electrolyte and improve the wetting of the porous cell components in the cell. In addition, cosolvents may also be added to the electrolyte to reduce the viscosity of the liquid and thereby increase the flow of electrolyte into the porous cell components of the cell. However, preparing electrolyte solutions with such chemistry adds materials to the electrolyte that do not contribute to the electrochemical performance of the cell, but do add to the manufacturing cost. In an alternative approach, a cell may be filled under vacuum to eliminate the slow displacement of gas from the pore structure when the electrolyte is added.

Additional complication, each current collector in the stack of cell must be filled. In this type of construction, each current collector in the stack (except the collectors at the ends of the stack) must serve as a positive electrode on one side and as a negative electrode on the other side. In bipolar stacks, the electrolyte on the positive side of the collectors must be isolated from the electrolyte on the negative side of the collectors to prevent ionic shunt currents between adjacent cells. Furthermore, the electrolyte in each cell must be isolated from all other cells in the stack to prevent electrolysis of the electrolyte. It is also very important that each cell in the bipolar stack receive the same amount of electrolyte, as cells with disproportionately less electrolyte exhibit slightly higher resistance, and cycle between slightly larger voltage limits. These cells fail prematurely with respect to other cells in the stack and cause a failure of the entire stack. Electrolyte deficient cells may also be driven into reversal by the other cells in the stack leading again to premature failure of the entire stack. These conditions warrant that each cell in the stack must have a perimeter seal at the edge of the current collectors to retain the electrolyte in the cell.

For the above reasons, the process of adding electrolyte to the bipolar stacks of cells require special methods. In one prior art method, a fill port is included in each perimeter seal of the stack of cells. A manifold of tubing connects each fill port to an electrolyte supply-reservoir. During the filling process, the electrolyte from the reservoir is injected under pressure via fill ports into each cell. In this approach, cells may be evacuated prior to injection of the electrolyte to remove trapped gas and to aid in the distribution of the electrolyte throughout the cell. Once cells are filled with electrolyte, the manifold can be left in place. However, valves to each cell must be can be removed and, each fill port can be sealed individually.

In another prior art method, a fill port is included in each perimeter seal of each cell. The aligned fill ports in the bipolar stack ate submerged in electrolyte and a vacuum is applied to extract the gas from the cell components. As the stack is brought back to atmospheric pressure, the electrolyte is drawn into the individual cells. The excess electrolyte is then cleaned from the outside of the cell stack, and each fill port is sealed.

In yet another prior art method, each side of the bipolar current collector is fitted with an elastic gasket to form a shallow cup which contains the anode and cathode materials on either side of the current collector. In this method, the anode or the cathode or both electrodes may be prepared as slurries comprising an active electrode material and an electrolyte. Carbon powder may also be added to this slurry to enhance the electronic conductivity of the electrode. These electrolyte soaked bipolar electrodes are stacked between porous separators under pressure. The elastic gaskets hold the separators in place and seal the perimeters of the cells. Alternatively, the gaskets are made of thermal plastics which are thermally sealed after the bipolar electrodes are stacked in series with the separators. In these cases fill ports are not required.

For all of these methods, attention must be directed to the distribution of the electrolyte in the cell during closure of the cell and closure of the fill ports. Typically, cells and fill ports are closed or sealed with adhesives, thermal plastics, elastomers (crimp seals), or by welding when metal containers (cans) are used. In order to provide a leakage free seal, all joining surfaces must be free of electrolyte.

There is a need in the electrochemical cell manufacturing industry for processes for filling thin electrochemical cells with electrolyte without using fill ports or evacuation apparatus. Such processes must quickly and accurately meter and uniformly distribute the electrolyte throughout the pore structure of the electrodes and separator without contacting the surfaces of the perimeter seals or other joining surfaces.

SUMMARY OF THE INVENTION

The aforementioned needs are satisfied by the process of the present invention which is directed to the use of non-contact printing technologies to fill thin porous electrochemical cells with ionically conductive electrolyte. In the preferred embodiment of the present invention, an ink-jet printing process is utilized to print the electrolyte onto the surface of the electrodes and separators or the electrode/separator bilayers.

Specifically, in the preferred embodiment of the present invention, the ink-jet printing accurately meters and uniformly distributes the electrolyte throughout the pore structure of the separator and the electrode without contaminating the cell gasket. Preferably, a drop-on-demand ink-jet printing head is used to facilitate the electrolyte printing process. The ink-jet printing head is electronically pulsed to form and eject the electrolyte droplets from a nozzle of the printinghead. The volume and the distribution of each electrolyte droplet are accurately determined and controlled by varying the pulse width and the pulse frequency of the printing head. Preferably, individual drops of electrolyte act like the pixels of a picture and forms a desired electrolyte dot matrix image on the surface of the electrodes and separators.

In another embodiment of the present invention, a solvent of an electrolyte is printed onto porous electrode or separator layers containing an electrolyte salt in their structure. In-situ dissolution of the salt into the solvent yields the desired electrolyte for the electrochemical cell.

In another embodiment of the present invention, separate print heads for each solvent are used to vary the ratio of different solvents in an electrolyte solution comprising a mixture of solvents.

It will be appreciated that there are multiple aspects of the present invention. In one aspect of the present invention, a process for manufacturing an electrochemical cell is provided. The process is comprised of the steps of providing an electrode, and applying electrolyte using an ink-jet printer.

In another aspect of the present invention, a process for filling an electrochemical cell with electrolyte is provided. The process is comprised of the steps of providing a porous separator layer and placing the electrolyte in a selected pattern using an ink jet printer.

In another aspect of the present invention, an electrochemical cell is provided. The electrochemical cell is comprised of a first electrode and a second electrode, a separator sandwiched between the first and second electrode, and an electrolyte introduced into the separator using an ink-jet printing process prior to lamination of the electrode-separator-electrode sandwich.

In another aspect of the present invention, an ink-jet printing cartridge is provided. The ink-jet cartridge is comprised of an ink jet printing orifice for ejecting electrochemical cell electrolyte, and a source of electrochemical cell electrolyte connected to the orifice.

In yet another aspect of the present invention, a process of distributing electrolyte in a selected pattern is provided. The process is comprised of the steps of: placing the electrolyte into a source tank of an ink-jet printer and ejecting the electrolyte through a nozzle in the selected pattern wherein the nozzle is connected to the source tank.

These and other objects and advantages of the present invention will become more fully apparent from the following description taken in conjunction with the accompanying drawings.

BRIEF DESCRIPTION OF THE DRAWINGS

FIG. 3 is a schematic exploded view of the partially manufactured electrochemical cell shown in FIG. 2;

FIG. 4 is a schematic cross-sectional view of the partially manufactured electrochemical cell shown in FIG. 2 wherein an electrolyte solution has been printed on the bilayer;

FIG. 5 is a schematic cross-sectional view of an exemplary drop-on-demand ink-jet printing head;

DETAILED DESCRIPTION OF THE PREFERRED EMBODIMENT

Figure 1:
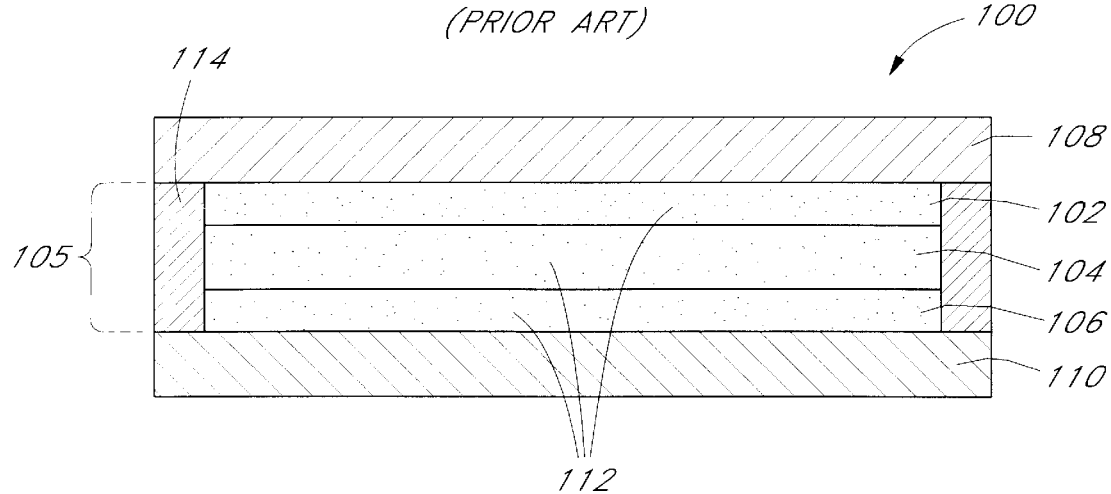
FIG. 1 is a schematic cross-sectional view of a prior art electrochemical cell.

Reference will now be made to the drawings wherein like numerals refer to like parts throughout. FIG. 1 illustrates an exemplary electrochemical cell structure 100 comprising a porous stack 105 having a thin separator layer 104 interposed between the thin layers of a cathode active electrode 102 and an anode active electrode 106. Current collectors 108 and 110 connect the electrochemical cell 100 to external circuitry (not shown). An electrolyte solution 112 (represented by dots in FIG. 1) is also contained within the porous structure of the porous stack. The electrolyte solution 112 preferably fills the pores of the separator 104 and the active electrodes 102, 106. A gasket 114 bonded to the current collectors seals the perimeter of the porous stack thereby preventing electrolyte leakages. As will be described more fully hereinbelow, the process of the preferred embodiment provides a method to fill thin electrochemical cells by selectively printing an electrolyte solution onto a porous electrode layer or a porous electrode-separator bilayer.

The fabrication of a preferred electrochemical cell comprising preferred ink jet printing of electrolyte solution is illustrated in FIGS. 2 through 7.

Figure 2:
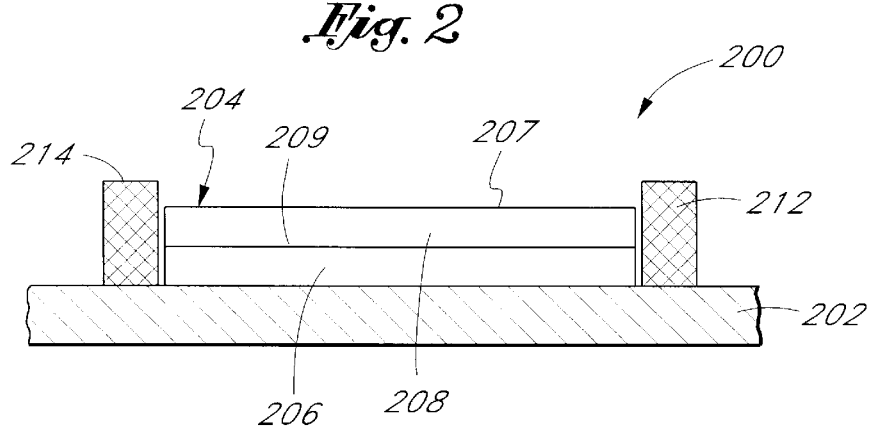
FIG. 2 is a schematic cross-sectional view of a partially manufactured electrochemical cell of the present invention wherein a bilayer structure and a gasket have been formed on a substrate.

FIG. 2 shows a partially manufactured electrochemical cell 200 before being filled with electrolyte. The partial cell structure 200 comprises a current collector substrate 202, and a porous layer 204 formed directly on the substrate 202. In this embodiment, although an aluminum foil is utilized as substrate, the composition of the substrate is dictated by the composition of the electrode, the composition of the electrolyte, the voltage of the cell as well as cost and other factors. Therefore, it is within the scope of the present invention to utilize any appropriate substrate. The electrochemical cell 200 further comprises a gasket 212, preferably a heat sealable polymer gasket, which is preferably attached to the substrate 202 and encloses the perimeter of the porous layer 204. As will be further explained, the gasket 212 comprises a top surface 214 for sealably closing the cell 200 when the cell is completed.

In accordance with one embodiment of the present invention, the preferred porous layer 204 may comprise a bilayer structure which is comprised of a first layer 206 and a second layer 208. The first layer 206 comprises an electrode layer, for example an anode active electrode, disposed directly on the current collector substrate 202. The second layer comprises a separator layer 208 formed on top of the first layer 206 and having an upper surface 207. The first layer 206 and the second layer 208 form an interface 209 at their adjoining surfaces. The porous structure of the second layer 208 continuously extends into the first layer 206 through the interface 209. Although, the preferred embodiment comprises a bilayer structure 204, it is to be understood that the use of a single-layer is also within the scope of this invention. In this case, the porous layer 204 may only comprise the active electrode layer 206.

In this embodiment, active electrode layer 206 may be made of a single active material or a mixture of active materials such as manganese oxides, cobalt oxides, vanadium oxides or nickel oxides. Although, in this embodiment, the active electrode 206 is preferably sized to have a surface area ranging from 1 cm$^2$ to 15 cm$^2$, the active electrode 206 may be sized to any desired surface area to meet the demands of the application. A preferred thickness range for the active electrode 206 may be between 5–25 microns. In this respect, the separator layer 208 is made of a suitable mixture of a solid particulate, such as alumina or silica, and a polymer binder. A preferred thickness range for the separator 208 may be 5–60 microns, more preferably 5–20 microns. Such a separator may be manufactured in accordance with my co-pending patent application Ser. No. 08/767,468, filed Jun. 19, 1996, still pending, titled Process of Manufacturing Porous Separator for Electrochemical Power Supply and co-pending patent application Ser. No. 08/847,098, filed May 1, 1997, still pending, titled Process of Manufacturing Porous Separator for Electrochemical Power Supply, which are hereby incorporated by reference herein.

In this embodiment, the electrode 206 and the separator 208 as well as the polymer gasket may preferably be manufactured using a screen or stencil printing process. As is shown in FIG. 3, in exploded view, a preferred manufacturing sequence, up to the step of filling the device with electrolyte, comprises the steps of: forming the electrode layer 206 on the current collector 202; forming the polymer gasket 212 on the current collector 202; and, forming the separator layer 208 on the electrode layer 206. It will be appreciated that the equipment for screen and stencil printing processes is commercially available and used for printing layers within the above thickness ranges. However, it will be also appreciated that such layers can be manufactured using any of well known techniques in the art.

As illustrated in FIG. 4, once the porous bilayer 204 and the gasket 212 are placed on the substrate 202, an electrolyte solution 216 is selectively deposited over the upper surface 207 of the separator 208 to fill the separator 208 and the electrode layers with electrolyte solution 216. In the process of the preferred embodiment, the selective deposition of the electrolyte solution is performed using a non-contact printing process such as an ink-jet printing process. As will be explained more fully hereinbelow, the advantageous ink-jet printing process of the present invention accurately meters and uniformly distributes the electrolyte 216 throughout the pore structure of the separator 208 and the electrode 206 without contacting the surface 214 of the gasket 212 or other surfaces. During the process, the electrolyte 216 is first supplied onto the upper surface 207 by printing the electrolyte across the upper surface 207 of the separator layer 208. Once uniformly supplied onto the surface 207, the electrolyte percolates down through the pores of the bilayer 204 (in the direction of the arrows in FIG. 4) to fill the pores of the separator 208 and the electrode 206.

Within the concept of this invention various ink-jet systems, such as the continuous or drop-on-demand ink-jet systems, can be used to facilitate the ink-jet printing of the electrolyte. In the preferred embodiment, a drop on demand ink-jet system, such as a piezo ink-jet system, may preferably be used. An example of such piezo ink-jet systems is the Kyser and Sears planar-membrane type ink-jet which is available from On Target Technology, Inc., Santa Clara, Calif.

As illustrated in FIG. 5, a printing head of the piezo ink-jet printing system comprises a piezo electric crystal 302, which is connected to a voltage source (not shown), attached to a wall 304 of an ink (electrolyte) cavity 305. The cavity 305 is connected to a printing nozzle 306 through an orifice 308. In order to increase printing density, the ink-jet printing head may comprise a plurality of cavities 305 and nozzles 306. Further, the cavity may be connected to a larger electrolyte reservoir (not shown) through a conduit 310. During the process of the preferred embodiment, an applied voltage pulse induces the piezoelectric crystal 302 to flex the cavity wall 304 thereby pressuring the electrolyte in the cavity and causing the ejection of an electrolyte droplet from the nozzle 306. In this respect, the amount and the distribution of the electrolyte can be precisely adjusted by varying the pulse width and the frequency of the signal supplied to the crystal 302. It will be appreciated that a wider pulse and the resulting longer duration of high pressure in the electrolyte cavity 305 creates an ejected drop from the nozzle 306 with a larger volume of electrolyte. Similarly, the pulse frequency affects the volume per unit time, and thus, the distribution of the ejected electrolyte drops.

Figure 6:
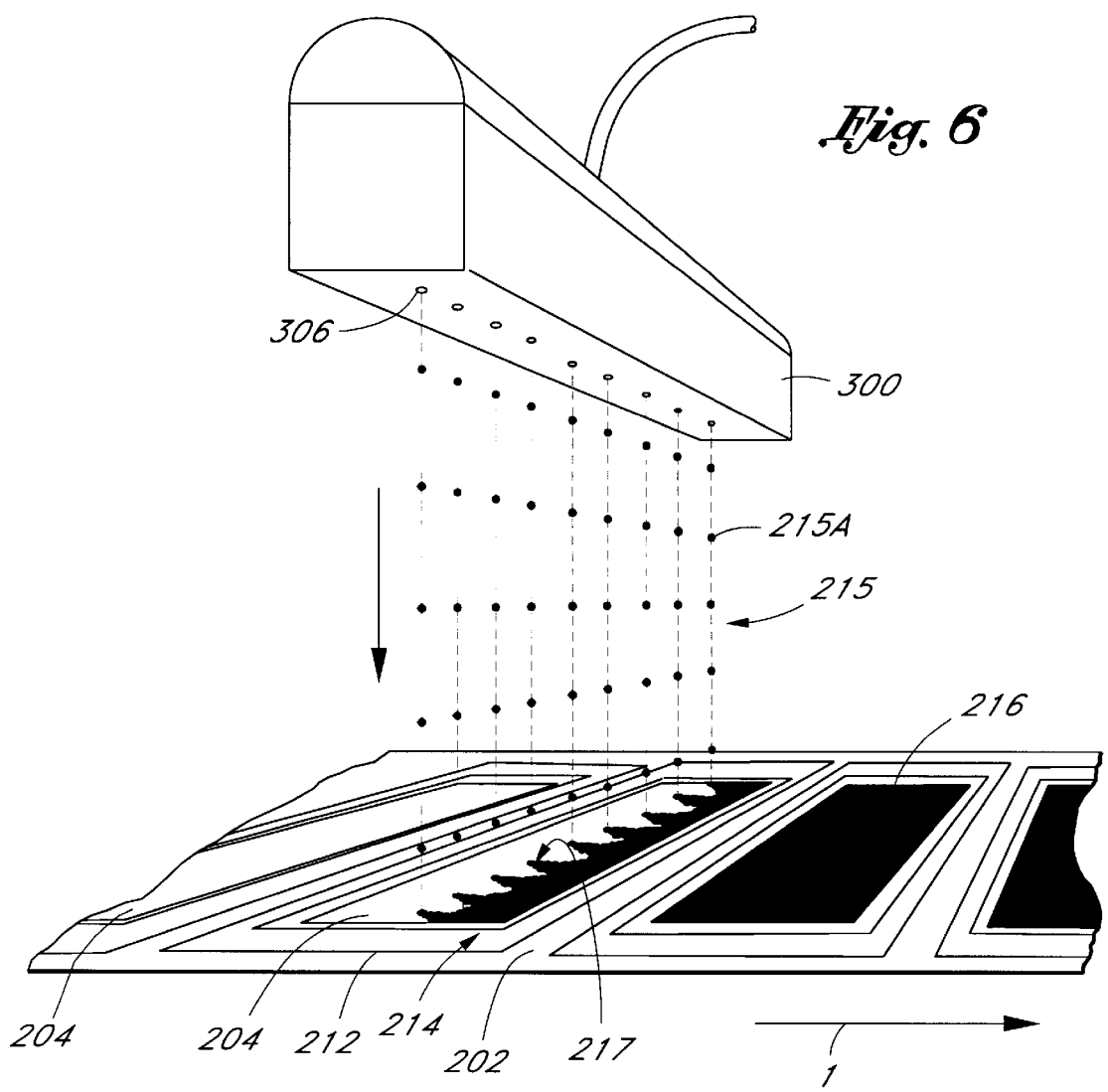
FIG. 6 is a schematic perspective view of an embodiment of the process of the invention.

FIG. 6 illustrates the process of printing the electrolyte 216 on separator layers using the ink-jet head 300. In this embodiment, the ink-jet head 300 is configured to have a plurality of print nozzles 306. During the process, a plurality of as-printed porous bilayers 204 are passed (in the direction of the arrow 1) beneath the inkjet head 300. Preferably, the print head 300 is placed 1–5 mm above the passing bilayers 204. As previously explained, each bilayer 204 is configured to have a heat sealable polymer gasket 212 printed around its perimeter. During the process, the print head 300 is pulsed to distribute a uniform matrix 215 of individual electrolyte drops 215A onto bilayer 204 without contaminating the gasket surfaces 214. Accordingly, in the preferred embodiment, individual drops 215A with known volumes are applied much like pixels of a printed picture and form an electrolyte dot matrix image 217 on the surface of the bilayer 204. In accordance with the principles of the present embodiment, nozzles 306 may be pulsed in unison or controlled individually to accommodate the shape and the pore volume of the bilayer 204. Since the ink-jet process of the present invention provides precise and reproducible drop volumes of the electrolyte, a desired pattern of precisely measured volumes of electrolyte can be repeatedly printed onto a plurality of bilayers 204. Further, due to the precision of the printing process, no electrolyte 216 is deposited onto gasket surfaces 214. It is possible, for example, to deposit a greater density of drops in the center of the bilayer 204 than at the margins, to accommodate for 360° dispersion of dots at the center and 180° dispersion at the edges.

Once the separator 206 and the anode electrode 208 (FIG. 2) are filled with the electrolyte, a cathode active electrode, which is also printed on a substrate, is simultaneously filled using the ink-jet printing process of the present embodiment.

In the following manufacturing step, the partial electrochemical cell 200 (FIG. 2) and the cathode electrode are stacked facing one another and heat sealed along the perimeter of the polymer gasket 212 to complete cell manufacturing. As opposed the prior art, fill ports are not needed for this process. Further, due to the precision of the electrolyte printing process, the gasket 212 does not require an additional cleaning step.

The process of the preferred embodiment can also be advantageously used to perform alternative processes. In one alternative process, the electrolyte of the cell may be formed by an in-situ salt dissolution process. Typically, an electrolyte solution comprises a salt such as lithium hexafluorophosphate dissolved in a solvent such as propylene carbonate or a mixture of solvents. During the electrolyte printing process, if the vapor pressure of the solvent(s) in the electrolyte is high, the solvent may evaporate near the nozzle 306 or orifice 308 of the print head 300. This may lead to the crystallization of the electrolyte salt in the nozzle 306 or the orifice 308 thereby causing deterioration of the nozzle 306 and the orifice 308. As such, some electrolyte compositions may be highly corrosive so that the electrolyte may corrode the nozzle 306 and the orifice 308. In such circumstances, the electrolyte salt may be included as a part of the electrode 206 or separator 208 of the cell 200. For example, this may be accomplished by adding an appropriate mass of an electrolyte salt in a precursor solution of the porous electrodes 206 and separators 208. The amount of the salt depends on the molecular weight of the salt and the desired final concentration. As previously explained, this precursor solution comprising the salt can be also printed using a screen or stencil printing process. Thereafter, the ink-jet printing head 300 may uniformly distribute a desired volume of solvent over the bilayer comprising the electrolyte salt thereby dissolving the salt in the bilayer structure. Subsequently, in-situ dissolution of the salt into the solvent yields the desired electrolyte for the electrochemical cell. Another advantage of this alternative process is to increase porosity of the electrodes 206 or separators 208 by dissolving the salt in their porous structure. The same alternative process may also be used to avoid printing corrosive electrolyte solutions which may otherwise corrode the nozzle 306 or the orifice 308.

In another alternative process, separate print heads may be used to print electrolytes comprising a mixture of solvents. In this alternative embodiment, the ratio of the solvents in an electrolyte may be advantageously varied using separate ink-jet print heads for each solvent. This is made possible by electronically driving the separate print heads at different pulse frequency rates or different pulse widths to achieve the desired solvent ratio. In a similar fashion, one can vary the concentration or ratio of electrolyte salts using several print heads with different electrolytes or electrolyte concentrations. The use of two or more printing heads in tandem enables the use of a broad range of easily varied electrolyte compositions without the need to preformulate these compositions.

Figure 7:
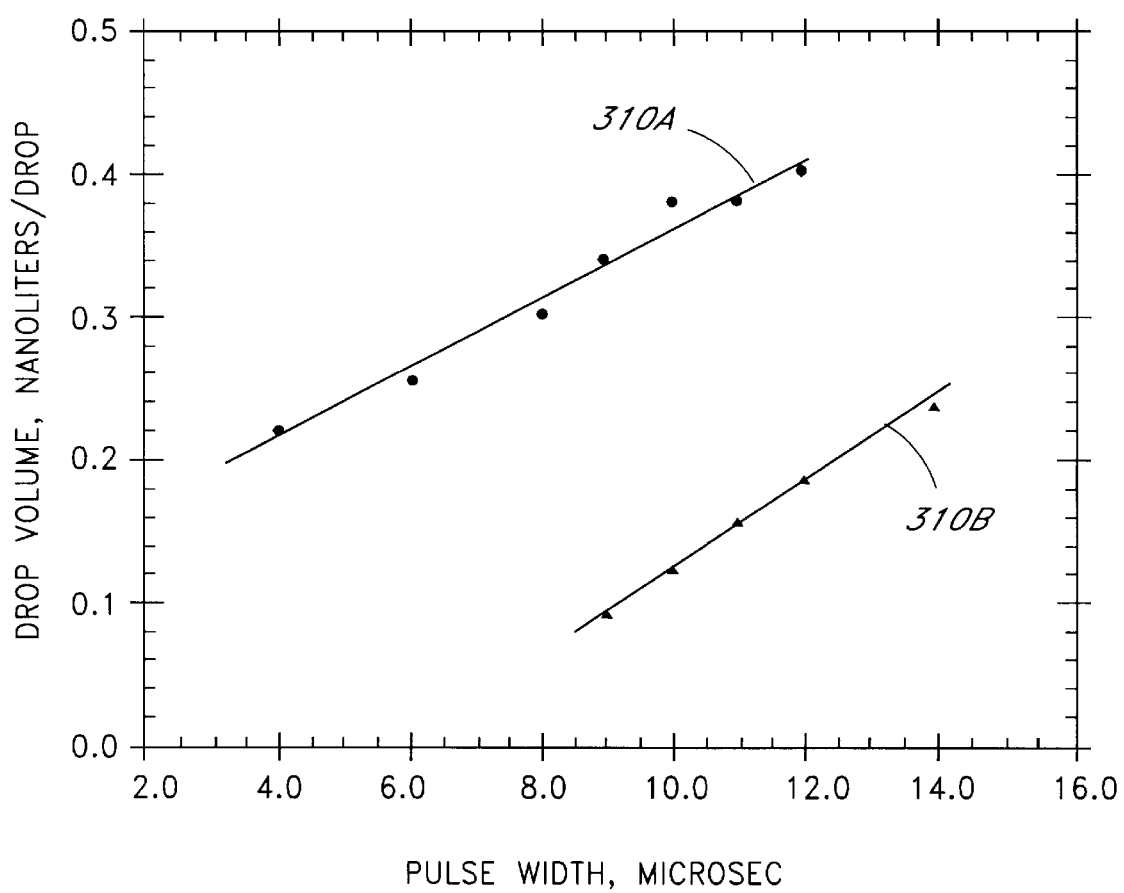
FIG. 7 is a graph comparing the drop volume-pulse width characteristics of two commercial ink-jet printing heads.

In accordance with the process of the present invention, various commercial drop-on-demand ink-jet printer heads can advantageously be utilized to change the volume of the discrete electrolyte droplets by varying the pulse width. This behavior is clearly demonstrated with the diagram in FIG. 7 which compares the drop volume-pulse width characteristics of two commercial ink-jet printing heads. In FIG. 7, a first data group 310A represents the experimental data from a stainless steel ink-jet printing head having 32 nozzles. A second data group 310B represents the experimental data from a ceramic printing head having 64 nozzles. As seen in FIG. 7, in either of these printing heads, the drop volume linearly increases with respect to increasing pulse width. Details of these experiments can be found in the following examples.

EXAMPLE 1

A 32 nozzle stainless steel print head was flushed with alcohol and primed with propylene carbonate. To avoid corrosion of the stainless steel components of the print head, no salt was dissolved in the propylene carbonate. The 32 nozzles were pulsed in unison with voltage pulses of 75 V. The pulse width was varied from 4 micro seconds to 12 micro seconds with a duty cycle of 500 Hz (500 pulses per second). Each of the 32 nozzles ejected 500 droplets of propylene carbonate per second. The solvent from the 32 nozzles was collected and weighed, the total volume was computed by dividing the total mass of the solvent by its gravimetric density. The volume of each droplet was computed by dividing the total volume of electrolyte collected by the product (32 * the total number of pulses applied to the print head). The droplet volume is plotted as a function of pulse width in FIG. 7.

EXAMPLE 2

A 64 nozzle ceramic print head was flushed with alcohol and primed with propylene carbonate. The 64 nozzles were pulsed in unison with voltage pulses of 75 V. The pulse width was varied from 9 micro seconds to 14 micro seconds with a duty cycle of 500 Hz (500 pulses per second). Each of the 64 nozzles ejected 500 droplets of propylene carbonate per second. The solvent from the 64 nozzles was collected and weighed, the total volume was computed by dividing the total mass of the solvent by its gravimetric density. The volume of each droplet was computed by dividing the total volume of electrolyte collected by the product (64 * the total number of pulses applied to the print head). The droplet volume is plotted as a function of pulse width in FIG. 7.

Hence, although the foregoing description of the preferred embodiment of the present invention has shown, described and pointed out the fundamental novel features of the invention, it will be understood that various omissions, substitutions, and changes in the form of the detail of the apparatus and method as illustrated as well as the uses thereof, may be made by those skilled in the art, without departing from the spirit of the present invention. Consequently, the scope of the present invention should not be limited to the foregoing discussions, but should be defined by the appended claims.

What is claimed is:

1. A process for manufacturing an electrochemical cell, comprising:

providing an electrode; and applying electrolyte to said electrode using an ink-jet printer.

2. The process of claim 1 wherein said step of applying electrolyte to said electrode comprises printing drops of said electrolyte on said electrode.

3. The process of claim 2 wherein said printing of drops of said electrolyte comprises forming a dot matrix image of said electrolyte on said electrode.

4. The process of claim 3 wherein said drops of said electrolyte have a known volume.

5. The process of claim 4 wherein said known volume of said drops is adjusted by varying a pulse applied to said ink-jet printer.

6. A process for filling an electrochemical cell with electrolyte, comprising:

providing a porous separator layer; and placing said electrolyte in a selected pattern on said separator layer using an ink-jet printer.

7. The process of claim 6, wherein said step of placing said electrolyte in a selected patten comprises forming a dot matrix image of said electrolyte on said separator.

8. The process of claim 7, wherein said dot matrix image is comprised of a combination of individual electrolyte drops.

9. The process of claim 8, wherein said individual drops comprise a known volume.

10. The process of claim 9, wherein said known volume of said individual drops is adjusted by varying a pulse applied to said ink-jet printer.

11. An ink jet printing cartridge, comprising:

an ink jet printing nozzle for ejecting electrochemical cell electrolyte consisting essentially of at least one salt and at least one solven; and a source of said electrochemical cell electrolyte is connected to said nozzle.

12. The ink jet printing cartridge of claim 11, wherein said electrolyte is ejected by applying a pulse to said source of electrochemical cell electrolyte so that discrete drops of said electrolyte ejected through said ink jet printing nozzle.

13. The ink jet printing cartridge of claim 12, wherein said discrete drops comprise a known volume.

14. The ink jet printing cartridge of claim 13, wherein said known volume of said discrete drops is adjusted by varying said pulse applied to said source of electrolyte.

15. A process of distributing electrolyte in a selected pattern comprising the steps of:

placing said electrolyte into a source tank of an ink-jet printer; and ejecting said electrolyte through a nozzle in said selected pattern wherein said nozzle is connected to said source tank.

16. The process of claim 14, wherein said step of ejecting said electrolyte comprises applying a pulse to said source tank to eject said electrolyte in discrete drops through said nozzle.

17. The process of claim 15, wherein said discrete drops comprise a known volume.

18. The process of claim 17, wherein said volume of said discrete drops is adjusted by varying said pulse applied to said source tank.

* * * * *

UNITED STATES PATENT AND TRADEMARK OFFICE
CERTIFICATE OF CORRECTION

PATENT NO. : 5,865,860
DATED : February 2, 1999
INVENTOR(S) : Delnick, Frank M.

It is certified that error appears in the above-identified patent and that said Letters Patent is hereby corrected as shown below:

Claim 11, column 10, line 7, "solven" should read --solvent--.

Signed and Sealed this

Sixteenth Day of May, 2000

Attest:

Attesting Officer

Q. TODD DICKINSON

Director of Patents and Trademarks